(12) United States Patent
Wang et al.

(10) Patent No.: US 11,748,040 B2
(45) Date of Patent: Sep. 5, 2023

(54) EXTENDING A STORAGE SYSTEM BY UTILIZING STRIPES OF DIFFERENT WIDTHS ASSOCIATED WITH RESPECTIVE STORAGE ARRAY STANDARDS

(71) Applicant: EMC IP Holding Company LLC, Hopkinton, MA (US)

(72) Inventors: Sheng Wang, Beijing (CN); Dapeng Chi, Beijing (CN); Fang Yuan, Chaoy (CN); Chunhao Ni, Beijing (CN); Kui Zhai, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/741,771

(22) Filed: May 11, 2022

(65) Prior Publication Data

US 2023/0012813 A1  Jan. 19, 2023

(30) Foreign Application Priority Data

Jul. 19, 2021 (CN) .......................... 202110812686.4

(51) Int. Cl.
  *G06F 3/06* (2006.01)
(52) U.S. Cl.
  CPC ............ *G06F 3/0689* (2013.01); *G06F 3/061* (2013.01); *G06F 3/0631* (2013.01); *G06F 3/0647* (2013.01); *G06F 3/0683* (2013.01)

(58) Field of Classification Search
  CPC ...... G06F 3/0689; G06F 3/061; G06F 3/0631; G06F 3/0647–0649; G06F 3/0683
  See application file for complete search history.

(56) References Cited

U.S. PATENT DOCUMENTS

| | | | |
|---|---|---|---|
| 6,098,119 A * | 8/2000 | Surugucchi | ........... G06F 3/0689 711/170 |
| 10,852,966 B1 | 12/2020 | Liu et al. | |
| 11,068,176 B2 | 7/2021 | Wang et al. | |
| 11,150,820 B2 | 10/2021 | Fujii et al. | |
| 2008/0195808 A1* | 8/2008 | Chi | ...................... G06F 3/0619 711/E12.084 |
| 2021/0191619 A1 | 6/2021 | Dalmatov | |
| 2021/0318802 A1 | 10/2021 | Chen et al. | |
| 2021/0318825 A1 | 10/2021 | Fan et al. | |

\* cited by examiner

*Primary Examiner* — Chie Yew
(74) *Attorney, Agent, or Firm* — BainwoodHuang

(57) ABSTRACT

A technique extends a storage system that includes a first storage resource pool that is generated using a first plurality of storage devices and based on a first storage array standard. Such a technique involves: adding a second plurality of storage devices to the storage system in response to receiving a request to extend the storage system, the number of the second plurality of storage devices being less than the sum of a first stripe width associated with the first storage array standard and the number of backup storage devices in the first storage resource pool; and creating a second storage resource pool using the second plurality of storage devices and based on a second storage array standard, a second stripe width associated with the second storage array standard being less than the first stripe width. Accordingly, storage space can be extended faster and more effectively.

20 Claims, 6 Drawing Sheets

EXTENDING A STORAGE SYSTEM BY UTILIZING STRIPES OF DIFFERENT WIDTHS ASSOCIATED WITH RESPECTIVE STORAGE ARRAY STANDARDS

CROSS-REFERENCE TO RELATED APPLICATION

This application claims priority to Chinese Patent Application No. CN202110812686.4, on file at the China National Intellectual Property Administration (CNIPA), having a filing date of Jul. 19, 2021, and having "METHOD, DEVICE, AND PROGRAM PRODUCT FOR EXTENDING STORAGE SYSTEM" as a title, the contents and teachings of which are herein incorporated by reference in their entirety.

TECHNICAL FIELD

Implementations of the present disclosure relate to storage systems, and more particularly, to a method, a device, and a computer program product for extending a storage system.

BACKGROUND

With the development of data storage technologies, various data storage devices have been able to provide users with increasingly high data storage capabilities, and the data access speed has also been greatly improved. While data storage capabilities are improved, users also have increasingly high demands for data reliability and the response time of storage systems. At present, various data storage systems based on a Redundant Array of Independent Disks (RAID) have been developed to improve data reliability. When one or more disks in a storage system fail, data in the failed disks can be reconstructed from data on other normally operating disks.

A mapped RAID has been developed at present. In this Mapped RAID, disk is a logical concept and may include a plurality of extents. A plurality of extents included in a logical disk can be distributed on different physical storage devices in a resource pool of a storage system. For a plurality of extents in a stripe of the mapped RAID, the plurality of extents should be distributed on different physical storage devices. This makes it possible to perform, when a physical storage device where one of the plurality of extents is located fails, a reconstruction operation to recover data from physical storage devices where other extents are located.

It will be understood that a storage system includes limited storage space, and more storage devices can be added to the storage system to provide more storage space. At this point, there will be a great difference between usage loads of existing storage devices and of the newly added storage devices in the storage system, and thus a shuffle operation needs to be performed to balance the usage loads of the storage devices. The shuffle operation will last for a long time, which will seriously affect the performance of the storage system. At this point, how to perform an extending operation without affecting normal data storage services of the storage system as much as possible becomes a technical problem.

SUMMARY OF THE INVENTION

Thus, it is desired to develop and implement a technical solution for extending a storage system in a more effective manner. It is expected that this technical solution will be compatible with existing storage systems and will be able to extend storage systems in a more effective manner by modifying various configurations of existing storage systems.

According to a first aspect of the present disclosure, a method for extending a storage system is provided. The storage system includes a first storage resource pool that is generated using a first plurality of storage devices and based on a first storage array standard. A method includes: adding a second plurality of storage devices to the storage system in response to receiving a request to extend the storage system, the number of the second plurality of storage devices being less than the sum of a first stripe width associated with the first storage array standard and the number of backup storage devices in the first storage resource pool; and creating a second storage resource pool using the second plurality of storage devices and based on a second storage array standard, a second stripe width associated with the second storage array standard being less than the first stripe width.

According to a second aspect of the present disclosure, an electronic device is provided, including: at least one processor; and a memory coupled to the at least one processor, wherein the memory has instructions stored therein which, when executed by the at least one processor, cause the device to perform the method according to the first aspect of the present disclosure.

According to a third aspect of the present disclosure, a computer program product is provided. The computer program product is tangibly stored on a non-transitory computer-readable medium and including machine-executable instructions for performing the method according to the first aspect of the present disclosure.

BRIEF DESCRIPTION OF THE DRAWINGS

In combination with the accompanying drawings and with reference to the following detailed description, the features, advantages, and other aspects of implementations of the present disclosure will become more apparent, and several implementations of the present disclosure are illustrated here by way of examples rather than limitation. In the accompanying drawings.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred implementations of the present disclosure will now be described in more detail below with reference to the accompanying drawings. Although preferred implementations of the present disclosure are illustrated in the accompanying drawings, it should be understood that the present disclosure may be implemented in various forms and should not be limited by the implementations illustrated herein. Instead, these implementations are provided in order to make the present disclosure more thorough and complete, and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "one example embodiment" and "one embodiment" mean "at least one example embodiment." The term "another implementation" means "at least one additional implementation." The terms "first," "second," and the like may refer to different or identical objects. Other explicit and implicit definitions may also be included below.

Figure 1:
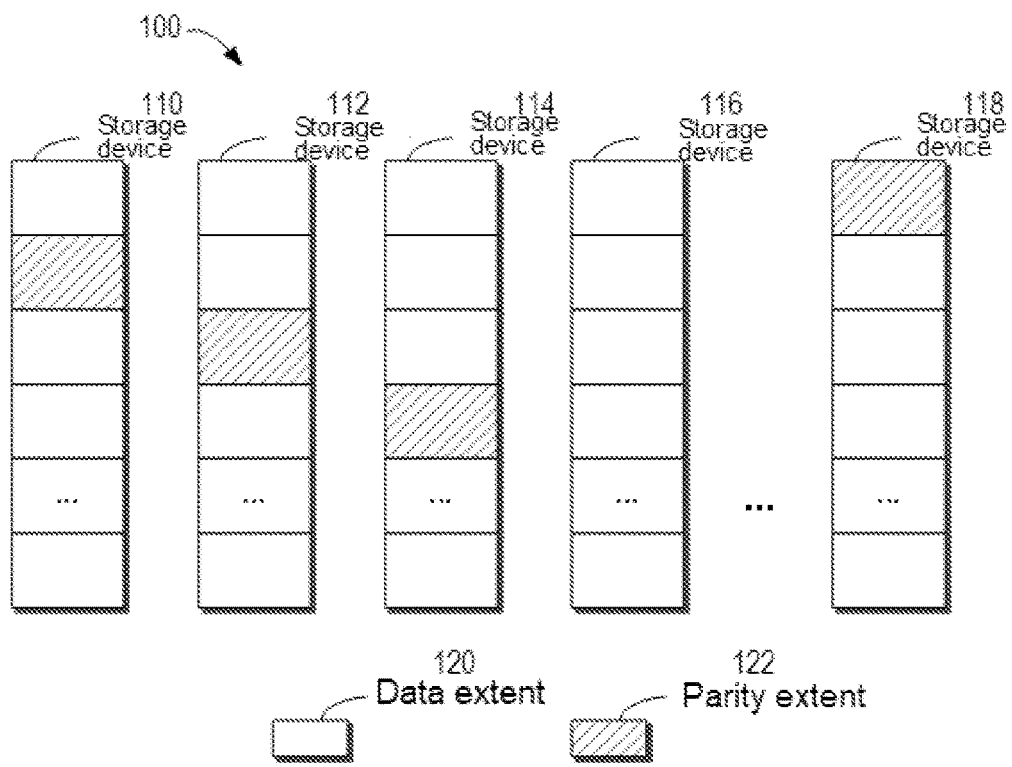
FIG. 1 schematically illustrates a block diagram of a storage system in which an example implementation according to the present disclosure can be implemented.

An overview of a storage system will first be described with reference to FIG. 1. FIG. 1 schematically illustrates a block diagram of storage system 100 in which an example implementation according to the present disclosure can be implemented. As shown in FIG. 1, storage system 100 may include a plurality of storage devices 110, 112, 114, 116, . . . , and 118. Each storage device may include a plurality of extents, and the plurality of extents can be managed based on a mapped RAID. A storage resource pool can be created based on a predetermined storage array standard. For example, when using a 4D+1P (4 extents for data storage and 1 extent for parity storage) RAID standard, one stripe can be created using 5 extents respectively located on 5 storage devices. At this point, 4 extents in the stripe can be used to store data (as shown by legend 120) and 1 extent can be used to store parities (as shown by legend 122).

As the storage system runs, available storage space in the storage system will gradually be exhausted. At this point, new storage devices can be added to the storage system to extend the storage space of the storage system. Various technical solutions have been proposed for extending a storage device. In one technical solution, one or more new storage devices can be added to a storage system. To ensure load balancing across storage devices, it is necessary to perform a shuffle operation among existing storage devices and the new storage devices in the storage system to migrate data from storage devices with higher usage loads to the new storage devices. However, for a large storage system, the shuffle operation will last for several days or even longer, which will seriously degrade the user experience of the storage system.

In another technical solution, a plurality of storage systems of which the number exceeds a predetermined number (e.g., the width of stripes in the storage system) can be added to the storage system. For example, in a 4D+1P storage system, 4+1=5 storage devices can be added to the storage system. At this point, the newly added 5 storage devices can form a new mapped RAID and can immediately provide data storage services to users of the storage system. It will be understood that the above 5 storage devices are only an example, and during the practical operation, the storage system will include backup storage devices for reasons such as reserving storage space. In this case, the number of new storage devices added to the storage system should be higher than the sum of the stripe width and the number of backup storage devices. For example, when the storage system includes 1 backup storage device, stripe width+1 (or more) new storage devices can be added. However, this technical solution requires adding a large number of storage devices at a time, which imposes numerous limitations to the extension of the storage system and increases the cost of managing the storage system.

To address the shortcomings in existing technical solutions, example implementations of the present disclosure propose a technical solution for extending a storage system. Hereinafter, an overview of an example implementation according to the present disclosure will be described with reference to FIG. 2. For the convenience of description, only a storage system including 5 storage devices and built based on a 4D+1P RAID standard will be used as an example below to describe the process of extending a storage system. According to an example implementation of the present disclosure, the storage system may also include more or fewer storage devices, and this storage system may be built based on other storage array standards.

Figure 2:
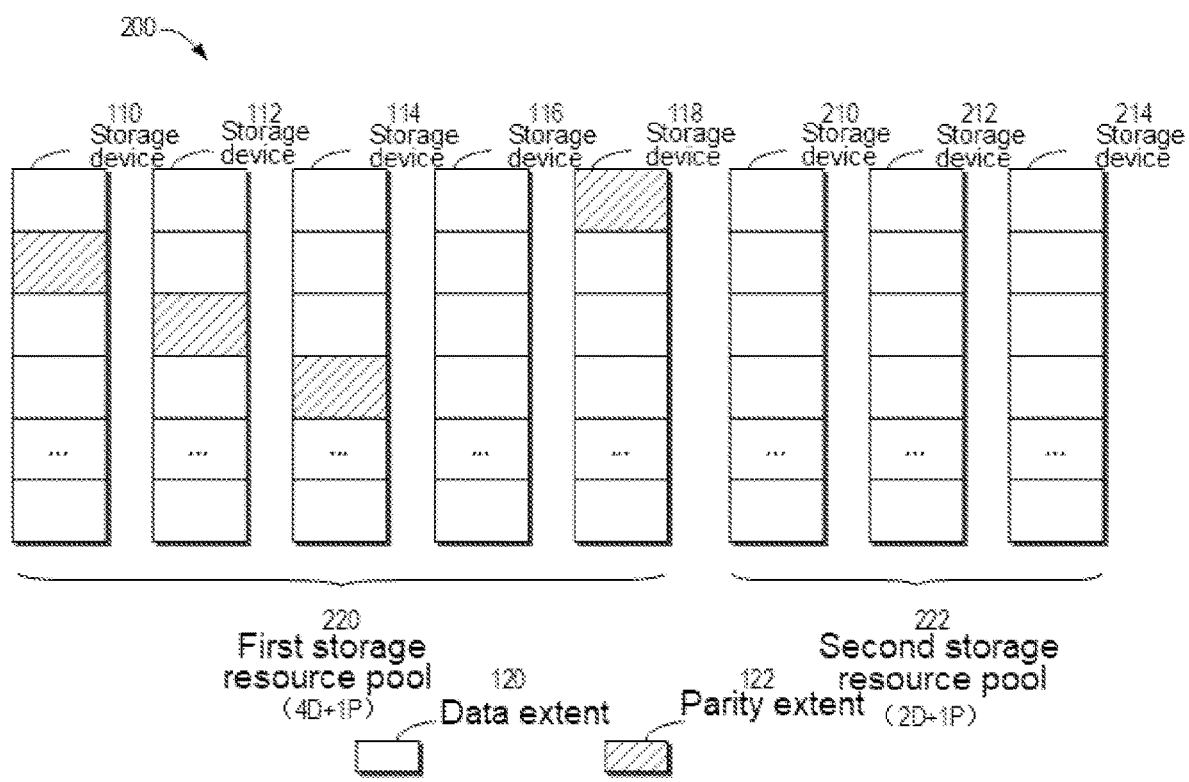
FIG. 2 schematically illustrates a block diagram for extending a storage system according to an example implementation of the present disclosure.

In the context of the present disclosure, the number of storage devices used to extend the storage system may be less than the sum of a stripe width and the number of backup storage devices, and immediate use of storage space in the newly added storage devices is allowed. FIG. 2 schematically illustrates block diagram 200 for extending a storage system according to an example implementation of the present disclosure. Prior to the extending operation, the storage system includes a first plurality of storage devices (the example of FIG. 2 includes 5 storage devices 110, 112, 114, 116, and 118). The storage devices form first storage resource pool 220 based on a first storage array standard (the 4D+1P RAID standard). A second plurality of storage devices (the example of FIG. 2 includes 3 storage devices 210, 212, and 214) can be added to the storage system.

Second storage resource pool 222 can be generated using the above storage devices 210, 212, and 214 and based on a second storage array standard (e.g., a 2D+1P RAID standard). At this point, the number of the second plurality of storage devices, which is 3, is less than the sum of a first stripe width, which is 5, associated with the first storage array standard and the number of backup storage devices (FIG. 2 does not include backup storage devices and thus the number of backup storage devices is 0 at this point). It will be understood that although the storage system illustrated in FIG. 2 does not include backup storage devices, according to an example implementation of the present disclosure, the storage system may include one or more backup storage devices, and assuming that the number of backup storage devices is 1, then the number of 3 is still less than the sum of the stripe width, which is 5, and the number of backup storage devices, which is 1.

It will be understood that since second storage resource pool 222 is a complete mapped RAID storage system, it can immediately serve a data access request from a user of the storage system. For example, when the storage system receives a request from a user to write user data to the storage system, it can immediately write the user data to second storage resource pool 222 without performing a shuffle operation. In this manner, the storage space in the newly added storage devices can be used immediately after the storage devices are added without performing a shuffle operation on various storage devices in the storage system or adding a large number of storage devices to the storage system at a time.

Figure 3:
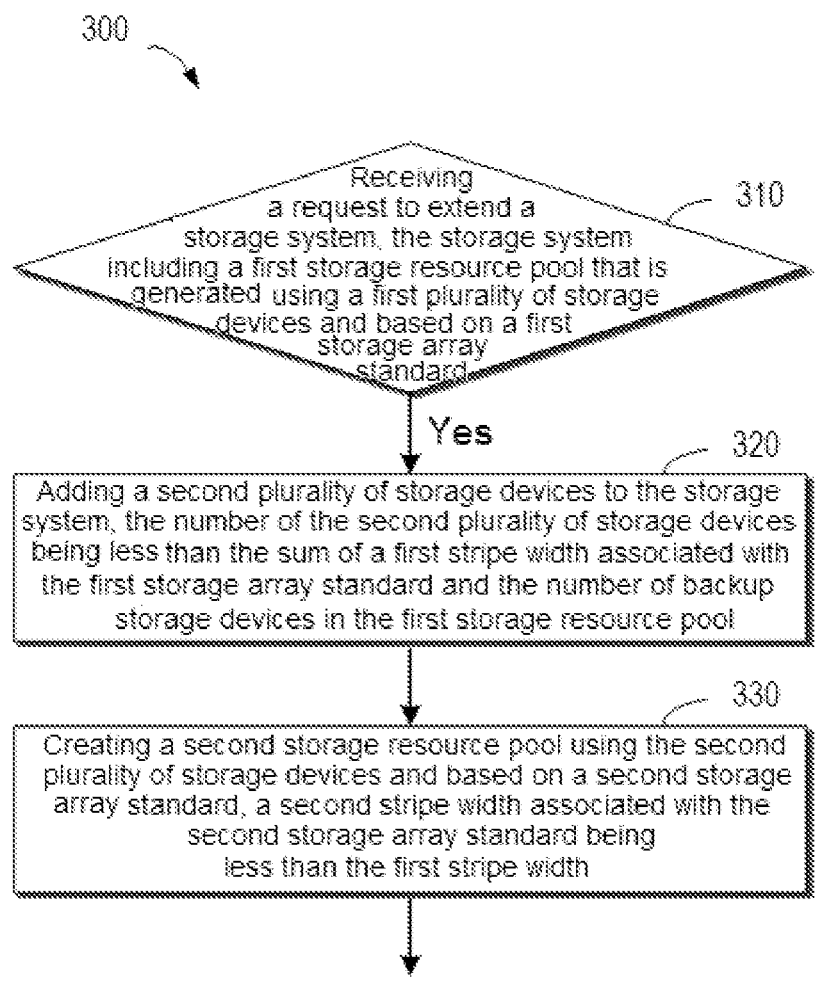
FIG. 3 schematically illustrates a flow chart of a method for extending a storage system according to an example implementation of the present disclosure.

Hereinafter, more details of an example implementation according to the present disclosure will be described with reference to FIG. 3. FIG. 3 schematically illustrates a flow chart of method 300 for extending a storage system according to an example implementation of the present disclosure. The storage system here includes first storage resource pool 220, and first storage resource pool 220 is generated using a first plurality of storage devices and based on a first storage array standard. At block 310, a request to extend the storage system can be received in the storage system. According to an example implementation of the present disclosure, the extending request can be issued automatically when it is detected that idle storage space included in the storage system is below a predetermined threshold. Alternatively and/or additionally, the extending request can be issued manually by an administrator of the storage system. Method 300 according to an example implementation of the present disclosure can be triggered by the extending request.

At block 320, a second plurality of storage devices can be added to the storage system if the extending request is received. Here, the number of the second plurality of storage devices is less than the sum of a first stripe width associated with the first storage array standard and the number of backup storage devices in the first storage resource pool. It will be understood that the number of the second plurality of storage systems here should be greater than or equal to 2 and less than the sum of the first stripe width and the number of backup storage devices.

According to an example implementation of the present disclosure, the first stripe width can be determined based on the sum of the numbers of data extents and parity extents in stripes in the first storage resource pool. In the example above, the first stripe width is 4+1=5. In the absence of backup storage devices, the number of the newly added storage devices can be selected from the following range of [2, 5). According to an example implementation of the present disclosure, in the presence of 1 backup storage device, the number of the newly added storage devices can be selected from the following range of [2, 5].

At block 330, second storage resource pool 222 can be created using the second plurality of storage devices and based on a second storage array standard. Here, a second stripe width associated with the second storage array standard is less than the first stripe width. In the example shown in FIG. 2, the first stripe width is 5 and the second stripe width is 3. At this point, second storage resource pool 222 can be created based on extents in storage devices 210, 212, and 214 and based on a 2D+1P RAID standard. With the example implementation of the present disclosure, once storage devices 210, 212, and 214 have been added to the storage system, idle extents in those storage devices can be used. In this manner, the impact of the extending operation and the subsequent shuffle operation on the performance of the storage system can be reduced, and thus more available storage space can be obtained at a higher speed.

Figure 4:
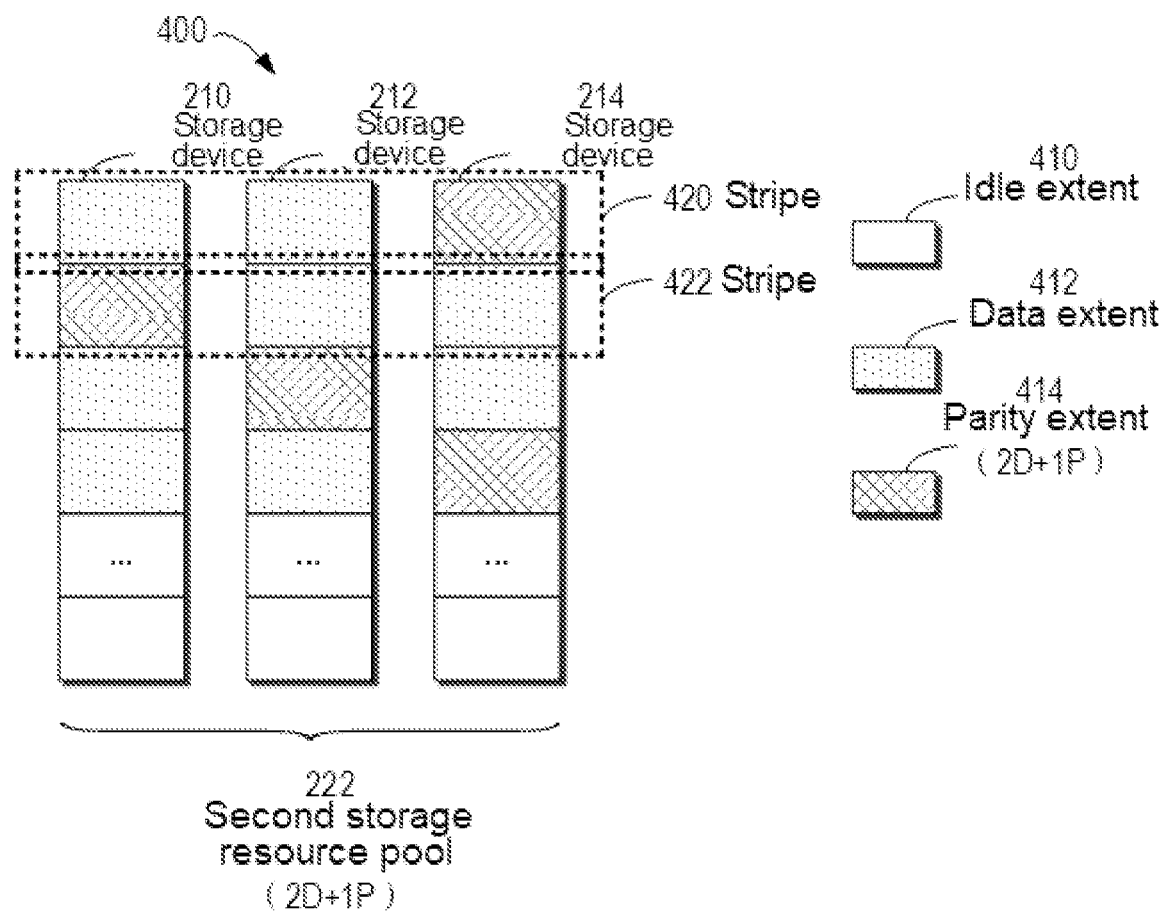
FIG. 4 schematically illustrates a block diagram for generating a second storage resource pool according to an example implementation of the present disclosure.

Hereinafter, more details of the generation of second storage resource pool 222 will be described with reference to FIG. 4. FIG. 4 schematically illustrates block diagram 400 for generating a second storage resource pool according to an example implementation of the present disclosure. As shown in FIG. 4, stripes in second storage resource pool 222 can be created using extents located at storage devices 210, 212, and 214, respectively, and based on the 2D+1P RAID standard. Specifically, legend 410 illustrates idle extents, legend 412 illustrates data extents, and legend 414 illustrates parity extents generated based on the 2D+1P RAID standard.

According to an example implementation of the present disclosure, each stripe can span a plurality of storage devices 210, 212, and 214. In stripe 420, the extents in storage devices 210 and 212 are data extents, and the extent in storage device 214 is a parity extent. In stripe 422, the extents in storage devices 212 and 214 are data extents, and the extent in storage device 210 is a parity extent. At this point, the distribution of the data extents and the parity extent of each stripe satisfies the 2D+1P RAID standard. It will be understood that although FIG. 4 only schematically illustrates two stripes 420 and 422, second storage resource pool 22 may also include more or fewer stripes.

According to an example implementation of the present disclosure, if a request to write user data to the storage system is received, the user data can be written to at least one stripe in second storage resource pool 222. According to an example implementation of the present disclosure, the user data can be divided based on sizes of extents in second storage resource pool 222, and the divided user data can be stored to one or more stripes in second storage resource pool 222.

Specifically, data portions and parity portions that are associated with the user data can be generated based on the second storage array standard. Further, the data portions and the parity portions can be written to the data extents and the parity extents, respectively, in the at least one stripe. For example, the user data can be divided into two portions, and the above two portions can be stored respectively to two data extents in stripe 420. Subsequently, a corresponding parity portion can be generated based on the two data extents, and this parity portion can be stored to the parity extent in stripe 420.

It will be understood that the above only schematically illustrates the situation where user data is stored in one stripe, and when the amount of the user data is large, the user data can be stored in more stripes. For example, when the size of the user data is 4 times the size of the data extents, the user data can be divided into 4 portions, and the above 4 portions can be respectively stored to data extents in stripe 420 and stripe 422. With the example implementation of the present disclosure, second storage resource pool 222 can operate as a standalone RAID storage system even though the RAID standard of second storage resource pool 222 is different from the RAID standard of first storage resource pool 220 at this time. In this manner, the storage space in second storage resource pool 222 can be used immediately without performing a shuffle operation. The storage system can provide hybrid RAID storage, and the downtime of the storage system can be reduced and the performance of the storage system can be improved while ensuring data reliability.

Figure 5:
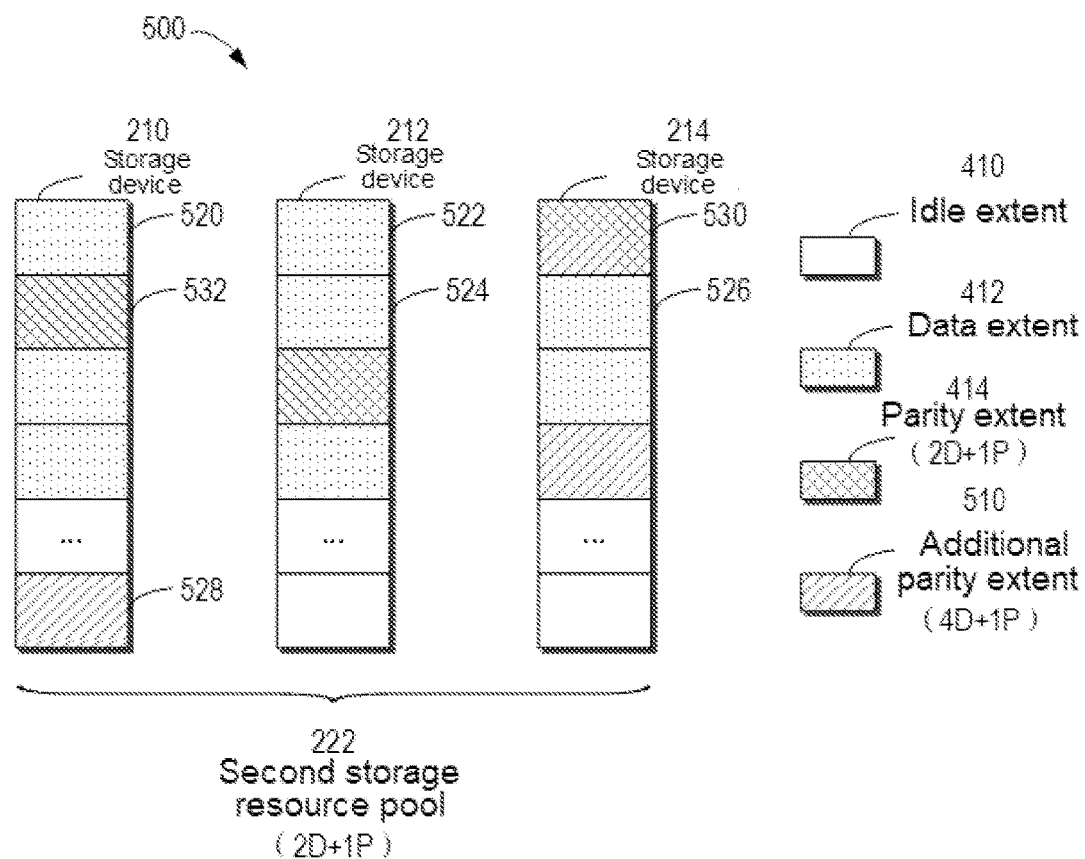
FIG. 5 schematically illustrates a block diagram for generating additional parity data for user data according to an example implementation of the present disclosure.

According to an example implementation of the present disclosure, a plurality of data protection measures can be provided in second storage resource pool 222. Specifically, the data in each stripe can be protected based on the 2D+1P RAID standard. Further, data in a plurality of stripes can be protected across a plurality of stripes based on the 4D+1P RAID standard. Hereinafter, more details will be described with reference to FIG. 5. FIG. 5 schematically illustrates block diagram 500 for generating additional parity data for user data according to an example implementation of the present disclosure.

As shown in FIG. 5, additional parity data can be generated across a plurality of stripes for each data extent in the plurality of stripes. In FIG. 5, legend 510 illustrates additional parity extents created based on the 4D+1P RAID standard. Specifically, a set of extents can be selected from a plurality of extents in the at least one stripe based on the 4D+1P RAID standard, and the number of the set of extents is determined based on the number of data extents in the first storage array standard. Specifically, the set of extents is selected from a plurality of data extents in the at least one stripe. In other words, only the data extents in the stripes, not the parity extents in the stripes, may be selected. In the case of the 4D+1P RAID standard, 4 data extents can be selected from the stripes in second storage resource pool 222, and additional parity extents can be created for the 4 extents.

According to an example implementation of the present disclosure, the stripes in second storage resource pool 222 can be processed sequentially. For example, data extents 520 and 522 can be selected from the first stripe, and data extents 524 and 526 can be selected from the second stripe. Further, additional parity data can be generated for data in data extents 520, 522, 524, and 526 based on the 4D+1P RAID standard, and the additional parity data can be stored to an idle extent (e.g., extent 528) in second storage resource pool 222. At this point, there may be double protection for data in second storage resource pool 222 at this point: extents 530 and 532 store parity data generated based on the 2D+1P RAID standard, and extent 528 stores additional parity data generated based on the 4D+1P RAID standard. In this manner, on the one hand, the data reliability of the storage system can be improved, and on the other hand, additional parity data that satisfies the first storage array standard can be generated in advance, thereby reducing the time overhead of the later shuffle operation.

It will be understood that although the above only schematically illustrates the process of creating additional parity data for 4 data extents, the additional parity data can also be created in different ways when other settings are used for the first storage array standard and the second storage array standard. According to an example implementation of the present disclosure, assume that the first storage array standard and the second storage array standard include the 12D+1P-based RAID standard and a mirroring RAID standard, respectively. At this point, each stripe in the second storage resource pool may include 2 extents, one of which stores data and the other stores mirrored data. 12 data extents can be selected respectively from 12 stripes in the second storage resource pool, and additional parity data can be generated for the selected 12 extents based on the 12D+1P RAID standard.

According to an example implementation of the present disclosure, assume that the first storage array standard and the second storage array standard include an 8D+1P+1Q-based RAID standard and the 4D+1P-based RAID standard, respectively. At this point, each stripe in the second storage resource pool may include 5 extents, 4 of which store data and 1 of which stores parities. 8 data extents can be selected from 8/4=2 stripes in the second storage resource pool, and two pieces of additional parity data can be generated based on the 8D+1P+1Q RAID standard.

Figure 6:
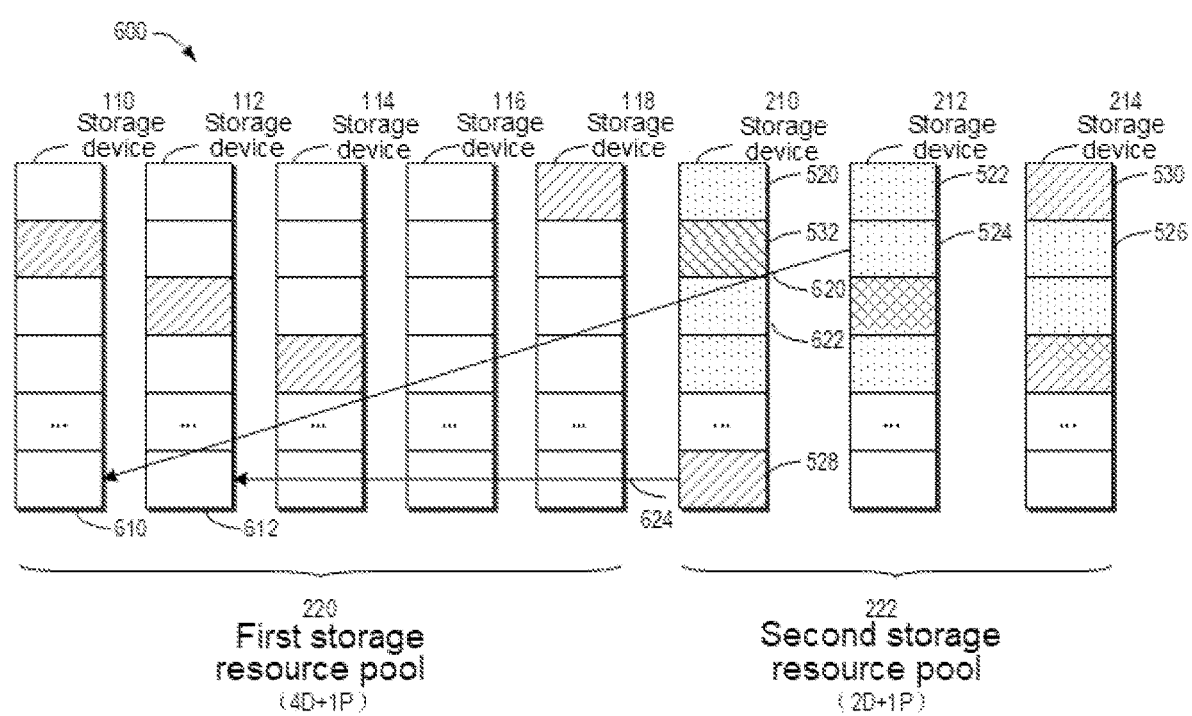
FIG. 6 schematically illustrates a block diagram for performing a shuffle operation according to an example implementation of the present disclosure.

The specific details of the two types of parity data in second storage resource pool 222 have been described above, and hereinafter, a description of how to use the additional parity data in second storage resource pool 222 to perform a shuffle operation will be provided with reference to FIG. 6. FIG. 6 schematically illustrates block diagram 600 for performing a shuffle operation according to an example implementation of the present disclosure. It will be understood that the purpose of the shuffle operation is to evenly distribute data extents and parity extents across storage devices in the extended storage system in accordance with the existing storage array standard (i.e., the 4D+1P RAID standard) of the storage system. According to an example implementation of the present disclosure, the shuffle operation can be triggered automatically when an imbalance in usage loads of the storage system is detected, the shuffle operation can be triggered periodically, or the shuffle operation can be triggered manually by the administrator of the storage system.

When a shuffle request is received, at least a portion of data in the set of extents and of the additional parity data can be migrated to the first plurality of storage devices based on the first storage array standard. In order to satisfy the first storage array standard, the devices where the migrated data and additional parity data are located should be located on different storage devices, and load balancing of the storage devices should be ensured as much as possible. Since the storage devices in first storage resource pool 220 have a high usage load and the storage devices in second storage resource pool 222 have a low usage load, the storage space in second storage resource pool 222 should be used as much as possible.

During migration, the position including a plurality of extents in a stripe to be migrated that satisfies the first storage array standard can be determined first. As shown in FIG. 6, data extents 520, 522, 524, 526, and 528 in second storage resource pool 222 generate a stripe to be migrated that satisfies the 4D+1P RAID standard. At this point, storage device 210 includes two extents 520 and 528. Since the RAID standard allows one storage device to include only one extent in one stripe, one of extents 520 and 528 should be migrated to a storage device in first storage resource pool 220. A storage device with a low usage load can be preferentially selected. For example, extent 528 can be migrated to extent 612 in storage device 112, as shown by arrow 624. Similarly, storage device 212 includes two extents 522 and 524 in the stripe to be migrated. As shown by arrow 620, one of the extents, 524, can be migrated to extent 610 in first storage resource pool 220.

Figure 7:
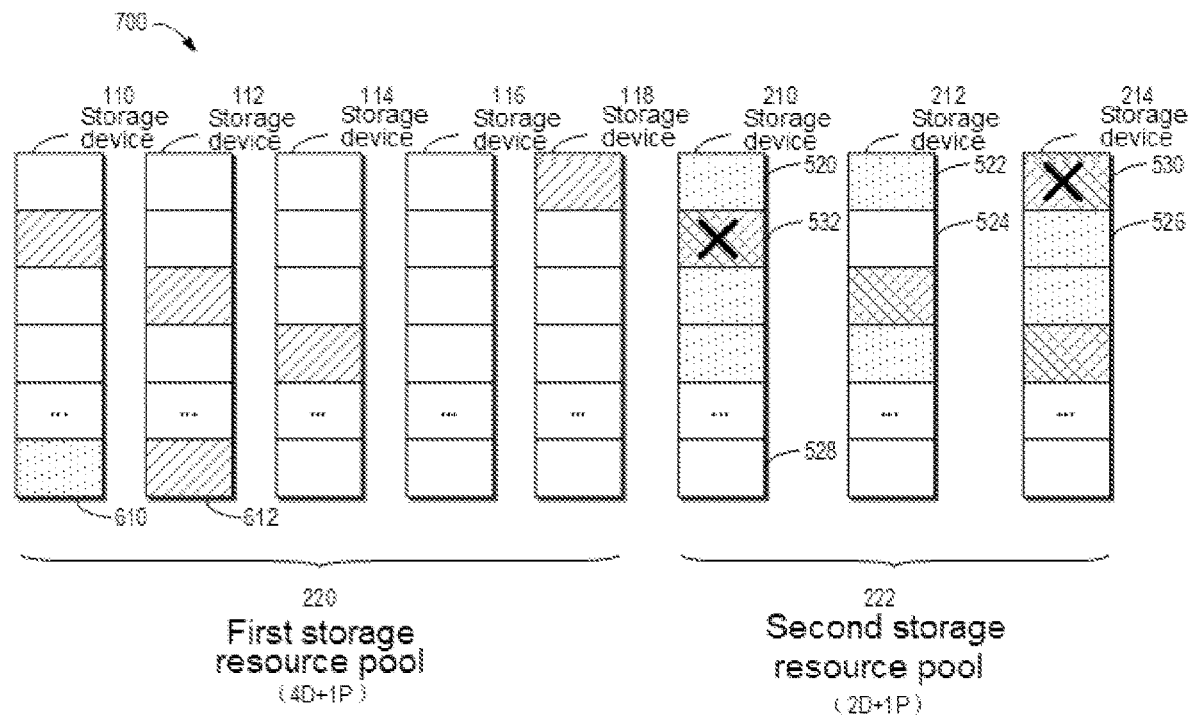
FIG. 7 schematically illustrates a block diagram of the distribution of data after migration according to an example implementation of the present disclosure.

Hereinafter, more details regarding the distribution of extents after migration will be described with reference to FIG. 7. FIG. 7 schematically illustrates block diagram 700 of the distribution of data after migration according to an example implementation of the present disclosure. As shown in FIG. 7, the migrated stripe includes extents 520, 522, 526, 610, and 612, where the first four extents are data extents and extent 612 is a parity extent. It will be understood that the additional parity data in extent 612 here is generated in advance and does not occupy the time of the shuffle operation, so the shuffle operation can be completed in a faster manner. According to an example implementation of the present disclosure, the shuffle operation can be performed in the backend to further improve the performance of the storage system.

According to an example implementation of the present disclosure, if it is determined that the at least a portion of data in the stripe to be migrated has been migrated, data in parity extents in the stripe that are associated with the set of extents may be released. It will be understood that after one stripe has been successfully migrated, the parity data in second storage resource pool 222 that is generated based on the 2D+1P RAID standard is no longer needed, and thus the parity data can be released. Specifically, the parity data in extents 530 and 532 can be released as shown in FIG. 7. With the example implementation of the present disclosure, storage space in the second storage resource pool that is no longer in use can be released after migration. In this manner, the storage system can be made to have more storage space available for storing user data.

It will be understood that the above only schematically illustrates the process for migrating one stripe, and the stripes to be migrated that satisfy the 4D+1P RAID standard in second storage resource pool 222 can be processed one by one in a similar manner. In this manner, extents from all stripes to be migrated in second storage resource pool 222 can be evenly distributed across all storage devices of the storage system. It will be understood that a portion of the extents in first storage resource pool 220 are also migrated to second storage resource pool 222 to ensure that usage loads of the storage devices in first storage resource pool 220 and in second storage resource pool 222 are as balanced as possible.

It will be understood that first storage resource pool 220 is a temporary name for the original plurality of storage devices in the storage system during the extending operation, and second storage resource pool 222 is a temporary name for the newly added plurality of storage devices during the extending operation, and these temporary names may be removed after completion of the extending operation. Specifically, if it is determined that data in all parity extents in the at least one stripe in second storage resource pool 222 has been released, all storage space in first storage resource pool 220 and second storage resource pool 222 is used as storage space in the storage resource pool of the storage system. Hereinafter, more details about the merge will be described with reference to FIG. 8.

Figure 8:
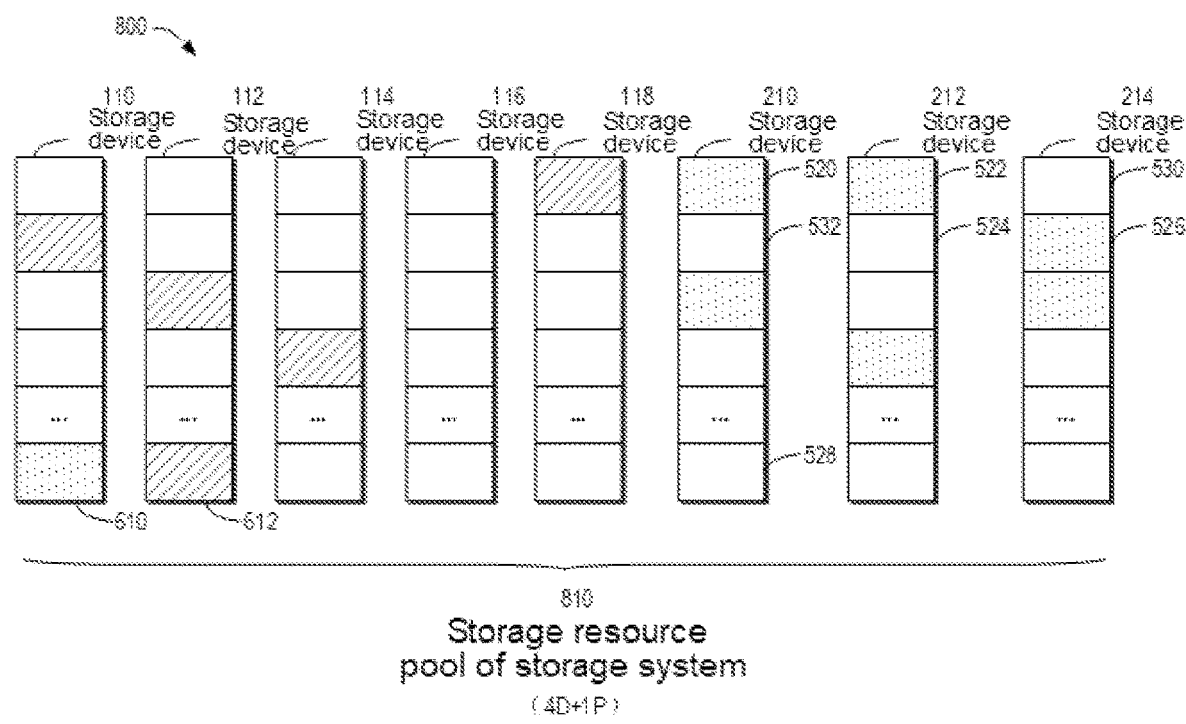
FIG. 8 schematically illustrates a block diagram for merging a first storage resource pool and a second storage resource pool according to an example implementation of the present disclosure.

FIG. 8 schematically illustrates block diagram 800 for merging a first storage resource pool and a second storage resource pool according to an example implementation of the present disclosure. As shown in FIG. 8, at this point, the newly added storage devices 210, 212, and 214 are used together with original storage devices 110, 112, 114, 116, and 118 as storage space in storage resource pool 810 of the storage system. Here, the extents in storage resource pool 810 form a stripe for storing user data based on the 4D+1P RAID standard. With the example implementation of the present disclosure, the storage space in the newly added storage devices can be used immediately without interrupting normal data storage services of the storage system to perform a shuffle operation or limiting the number of the newly added storage devices. In this way, the performance of the storage system can be improved, and the waiting time of a user of the storage system can be reduced, thereby improving the user experience.

It will be understood that the process for extending a storage system is described above using only the RAID standards based on 4D+1P and 2D+1P as examples of the first storage array standard and the second storage array standard, respectively. According to an example implementation of the present disclosure, other RAID standards may also be used. For example, a corresponding RAID standard can be selected for second storage resource pool 222 based on the number of newly added storage devices. When 2 storage devices are newly added, the mapped RAID standard can be selected; when 3 storage devices are newly added, the 2D+1P RAID standard can be selected; and when 4 storage devices are newly added, the 4D+1P RAID standard can be selected, and so on. In other words, as long as the number of newly added storage devices is less than the sum of the stripe width of the storage system and the number of backup storage devices, the method described above can be used to extend the storage system.

Examples of the method according to the present disclosure have been described in detail above with reference to FIGS. 2 to 8, and an implementation of a corresponding apparatus will be described below. According to an example implementation of the present disclosure, an apparatus for extending a storage system is provided, the storage system including a first storage resource pool that is generated using a first plurality of storage devices and based on a first storage array standard. This apparatus includes: an adding module configured to add a second plurality of storage devices to the storage system in response to receiving a request to extend the storage system, the number of the second plurality of storage devices being less than the sum of a first stripe width associated with the first storage array standard and the number of backup storage devices in the first storage resource pool; and a creating module configured to create a second storage resource pool using the second plurality of storage devices and based on a second storage array standard, a second stripe width associated with the second storage array standard being less than the first stripe width. According to an example implementation of the present disclosure, this apparatus further includes modules for performing other steps in method 300 described above.

Figure 9:
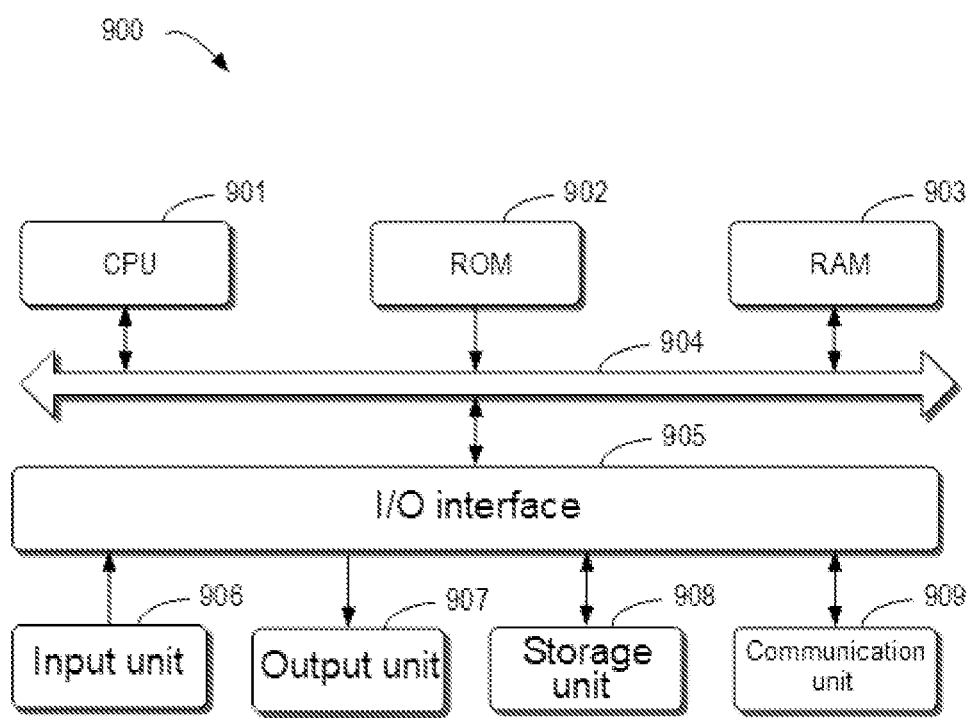
FIG. 9 schematically illustrates a block diagram of a device for extending a storage system according to an example implementation of the present disclosure.

FIG. 9 schematically illustrates a block diagram of device 900 for extending a storage system according to an example implementation of the present disclosure. As shown in the figure, device 900 includes central processing unit (CPU) 901 that may perform various appropriate actions and processing according to computer program instructions stored in read-only memory (ROM) 902 or computer program instructions loaded from storage unit 908 to random access memory (RAM) 903. Various programs and data required for the operation of device 900 may also be stored in RAM 903. CPU 901, ROM 902, and RAM 903 are connected to one another through bus 904. Input/output (I/O) interface 905 is also connected to bus 904.

A plurality of components in device 900 are connected to I/O interface 905, including: input unit 906, such as a keyboard and a mouse; output unit 907, such as various types of displays and speakers; storage unit 908, such as a magnetic disk and an optical disc; and communication unit 909, such as a network card, a modem, and a wireless communication transceiver. Communication unit 909 allows device 900 to exchange information/data with other devices via a computer network, such as the Internet, and/or various telecommunication networks.

The various processes and processing procedures described above, such as method 300, may be performed by processing unit 901. For example, in some implementations, method 300 may be implemented as a computer software program that is tangibly included in a machine-readable medium, such as storage unit 908. In some implementations, part or all of the computer program may be loaded and/or installed onto device 900 via ROM 902 and/or communication unit 909. One or more steps of method 300 described above may be performed when the computer program is loaded into RAM 903 and executed by CPU 901. Alternatively, in other implementations, CPU 901 may also be configured in any other suitable manner to implement the above processes/methods.

According to an example implementation of the present disclosure, an electronic device is provided, including: at least one processor; a volatile memory; and a memory coupled to the at least one processor, wherein the memory has instructions stored therein which, when executed by the at least one processor, cause the device to perform an action for extending a storage system. The storage system here includes a first storage resource pool that is generated using a first plurality of storage devices and based on a first storage array standard. The action includes: adding a second plurality of storage devices to the storage system in response to receiving a request to extend the storage system, the number of the second plurality of storage devices being less than the sum of a first stripe width associated with the first storage array standard and the number of backup storage devices in the first storage resource pool; and creating a second storage resource pool using the second plurality of storage devices and based on a second storage array standard, a second stripe width associated with the second storage array standard being less than the first stripe width.

According to an example implementation of the present disclosure, creating the second storage resource pool includes: creating at least one stripe in the second storage resource pool using the second plurality of storage devices and based on the second storage array standard, the distribution of data extents and parity extents in the at least one stripe satisfying the second storage array standard.

According to an example implementation of the present disclosure, the action further includes: writing, in response to receiving a request to write user data to the storage system, the user data to the at least one stripe in the second storage resource pool.

According to an example implementation of the present disclosure, writing the user data to the at least one stripe includes: generating data portions and parity portions that are associated with the user data based on the second storage array standard; and writing the data portions and the parity portions to the data extents and the parity extents, respectively, in the at least one stripe.

According to an example implementation of the present disclosure, creating the second storage resource pool further includes: selecting a set of extents from a plurality of extents in the at least one stripe based on the first storage array standard; generating additional parity data for user data in the set of extents based on the first storage array standard; and storing the additional parity data to an idle extent in the second storage resource pool.

According to an example implementation of the present disclosure, selecting the set of extents includes: selecting the set of extents from a plurality of data extents in the at least one stripe.

According to an example implementation of the present disclosure, the action further includes: migrating, in response to receiving a request to perform a shuffle operation in the storage system, at least a portion of data in the set of extents and of the additional parity data to the first plurality of storage devices based on the first storage array standard.

According to an example implementation of the present disclosure, the action further includes: releasing data in parity extents in the at least one stripe that are associated with the set of extents in response to determining that the at least a portion of data has been migrated.

According to an example implementation of the present disclosure, the action further includes: identifying all storage space in the first storage resource pool and the second storage resource pool as storage space of the storage system in response to determining that data in all the parity extents in the at least one stripe has been released.

According to an example implementation of the present disclosure, the first storage array standard and the second storage array standard include a standard based on a redundant array of independent disks, and the second storage array standard is determined based on the number of the second plurality of storage devices.

According to an example implementation of the present disclosure, a computer program product is provided, which is tangibly stored on a non-transitory computer-readable medium and includes machine-executable instructions, wherein the machine-executable instructions are used to perform the method according to the present disclosure.

According to an example implementation of the present disclosure, a computer-readable medium is provided. The computer-readable medium stores machine-executable instructions which, when executed by at least one processor, cause the at least one processor to implement the method according to the present disclosure.

The present disclosure may be a method, a device, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives a computer-readable program instruction from a network and forwards the computer-readable program instruction for storage in the computer-readable storage medium in the computing/processing device.

The computer program instructions for performing the operations of the present disclosure may be assembly instructions, instruction set architecture (ISA) instructions, machine instructions, machine-related instructions, microcode, firmware instructions, state setting data, or source or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user computer, or partly on a user computer, or as a stand-alone software package, or partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some implementations, an electronic circuit, such as a programmable logic circuit, a field programmable gate array (FPGA), or a programmable logic array (PLA), may be customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product according to implementations of the present disclosure. It should be understood that each block of the flow charts and/or the block diagrams and combinations of blocks in the flow charts and/or the block diagrams may be implemented by the computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing the functions/actions specified in one or more blocks in the flow charts and/or block diagrams. The computer-readable program instructions may also be stored in the computer-readable storage medium. The instructions enable a computer, a programmable data processing apparatus, and/or other devices to operate in a specific manner, so that the computer-readable medium storing the instructions includes an article of manufacture that includes instructions for implementing various aspects of functions/actions specified in one or more blocks in the flow charts and/or the block diagrams.

The computer-readable program instructions may also be loaded onto a computer, other programmable data processing apparatuses, or other devices, such that a series of operational steps are performed on the computer, other programmable data processing apparatuses, or other devices to produce a computer-implemented process. Thus, the instructions executed on the computer, other programmable data processing apparatuses, or other devices implement the functions/actions specified in one or more blocks in the flow charts and/or the block diagrams.

The flow charts and block diagrams in the drawings illustrate the architectures, functions, and operations of possible implementations of the systems, methods, and computer program products according to a plurality of implementations of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should also be noted that each block in the block diagrams and/or flow charts and a combination of blocks in the block diagrams and/or flow charts can be implemented using a dedicated hardware-based system for executing specified functions or actions, or can be implemented using a combination of dedicated hardware and computer instructions.

Various implementations of the present disclosure have been described above. The above description is illustrative and not exhaustive, and is not limited to the various implementations disclosed. Numerous modifications and alterations are apparent to persons of ordinary skill in the art without departing from the scope and spirit of the illustrated implementations. The selection of terms as used herein is intended to best explain principles and practical applications of the various implementations or improvements to technologies on the market, or to enable other persons of ordinary skill in the art to understand the implementations disclosed here.

The invention claimed is:

1. A method for extending a storage system, the storage system including a first storage resource pool that is generated (i) using a first plurality of storage devices and (ii) based on a first storage array standard, the method comprising:
   adding a second plurality of storage devices to the storage system in response to receiving a request to extend the storage system, a number of the second plurality of storage devices being less than a sum of (i) a first stripe width associated with the first storage array standard and (ii) a number of backup storage devices in the first storage resource pool, the number of backup storage devices being at least one; and
   creating a second storage resource pool (i) using the second plurality of storage devices and (ii) based on a second storage array standard, a second stripe width, associated with the second storage array standard, being less than the first stripe width.

2. The method according to claim 1, wherein creating the second storage resource pool includes:
creating at least one stripe, in the second storage resource pool, (i) using the second plurality of storage devices and (ii) based on the second storage array standard, a distribution of data extents and parity extents, in the at least one stripe, satisfying the second storage array standard.

3. The method according to claim 2, further comprising:
writing, in response to receiving a request to write user data to the storage system, the user data to the at least one stripe in the second storage resource pool.

4. The method according to claim 3, wherein writing the user data to the at least one stripe includes:
generating, based on the second storage array standard, data portions and parity portions that are associated with the user data; and
writing the data portions and the parity portions to the data extents and the parity extents, respectively, in the at least one stripe.

5. The method according to claim 3, wherein creating the second storage resource pool further includes:
selecting, based on the first storage array standard, a set of extents in the at least one stripe;
generating, based on the first storage array standard, additional parity data for the selected set of extents; and
storing the additional parity data to an idle extent in the second storage resource pool.

6. The method according to claim 5, wherein selecting the set of extents includes:
selecting the set of extents from the data extents.

7. The method according to claim 5, further comprising:
in response to receiving a request to perform a shuffle operation in the storage system, migrating, based on the first storage array standard, at least a portion of data, in the selected set of extents and the additional parity data, to the first plurality of storage devices.

8. The method according to claim 7, further comprising:
releasing, in response to determining that the at least a portion of data has been migrated, data in one or more of the parity extents that are associated with the selected set of extents.

9. The method according to claim 8, further comprising:
identifying, in response to determining that data in all the parity extents in the at least one stripe has been released, all storage space, in the first storage resource pool and the second storage resource pool, as storage space of the storage system.

10. The method according to claim 1, wherein each of the first storage array standard and the second storage array standard includes a respective standard based on a redundant array of independent disks, and the second storage array standard is determined based on the number of the second plurality of storage devices.

11. An electronic device, comprising:
at least one processor;
a volatile memory; and
a memory coupled to the at least one processor, wherein the memory has instructions stored therein which, when executed by the at least one processor, cause the electronic device to perform an action for extending a storage system, the storage system including a first storage resource pool that is generated (i) using a first plurality of storage devices and (ii) based on a first storage array standard, the action including:
adding a second plurality of storage devices to the storage system in response to receiving a request to extend the storage system, a number of the second plurality of storage devices being less than a sum of (i) a first stripe width associated with the first storage array standard and (ii) a number of backup storage devices in the first storage resource pool, the number of backup storage devices being at least one; and
creating a second storage resource pool (i) using the second plurality of storage devices and (ii) based on a second storage array standard, a second stripe width, associated with the second storage array standard, being less than the first stripe width.

12. The electronic device according to claim 11, wherein creating the second storage resource pool includes:
creating at least one stripe, in the second storage resource pool, (i) using the second plurality of storage devices and (ii) based on the second storage array standard, a distribution of data extents and parity extents, in the at least one stripe, satisfying the second storage array standard.

13. The electronic device according to claim 12, wherein the action further includes:
writing, in response to receiving a request to write user data to the storage system, the user data to the at least one stripe in the second storage resource pool.

14. The electronic device according to claim 13, wherein writing the user data to the at least one stripe includes:
generating, based on the second storage array standard, data portions and parity portions that are associated with the user data; and
writing the data portions and the parity portions to the data extents and the parity extents, respectively, in the at least one stripe.

15. The electronic device according to claim 13, wherein creating the second storage resource pool further includes:
selecting, based on the first storage array standard, a set of extents in the at least one stripe;
generating, based on the first storage array standard, additional parity data for the selected set of extents; and
storing the additional parity data to an idle extent in the second storage resource pool.

16. The electronic device according to claim 15, wherein selecting the set of extents includes:
selecting the set of extents from the data extents.

17. The electronic device according to claim 15, wherein the action further includes:
in response to receiving a request to perform a shuffle operation in the storage system, migrating, based on the first storage array standard, at least a portion of data, in the selected set of extents and the additional parity data, to the first plurality of storage devices.

18. The electronic device according to claim 17, wherein the action further includes:
releasing, in response to determining that the at least a portion of data has been migrated, data in one or more of the parity extents that are associated with the selected set of extents; and
identifying, in response to determining that data in all the parity extents in the at least one stripe has been released, all storage space, in the first storage resource pool and the second storage resource pool, as storage space of the storage system.

19. The electronic device according to claim 11, wherein each of the first storage array standard and the second storage array standard includes a respective standard based on a redundant array of independent disks, and the second storage array standard is determined based on the number of the second plurality of storage devices.

20. A computer program product having a non-transitory computer readable medium which stores a set of instructions to extend a storage system that includes a first storage resource pool that is generated (i) using a first plurality of storage devices and (ii) based on a first storage array standard;
- the set of instructions, when carried out by computerized circuitry, causing the computerized circuitry to perform a method of:
- adding a second plurality of storage devices to the storage system in response to receiving a request to extend the storage system, a number of the second plurality of storage devices being less than a sum of (i) a first stripe width associated with the first storage array standard and (ii) a number of backup storage devices in the first storage resource pool, the number of backup storage devices being at least one; and
- creating a second storage resource pool (i) using the second plurality of storage devices and (ii) based on a second storage array standard, a second stripe width, associated with the second storage array standard, being less than the first stripe width.

* * * * *